(12) United States Patent
Wakabayashi et al.

(10) Patent No.: US 9,266,034 B2
(45) Date of Patent: *Feb. 23, 2016

(54) HEAT INTEGRATED DISTILLATION APPARATUS

(71) Applicant: TOYO ENGINEERING CORPORATION, Tokyo (JP)

(72) Inventors: Toshihiro Wakabayashi, Narashino (JP); Takato Nakao, Narashino (JP)

(73) Assignee: TOYO ENGINEERING CORPORATION, Tokyo (JP)

( * ) Notice: Subject to any disclaimer, the term of this patent is extended or adjusted under 35 U.S.C. 154(b) by 249 days.

This patent is subject to a terminal disclaimer.

(21) Appl. No.: 13/775,029

(22) Filed: Feb. 22, 2013

(65) Prior Publication Data

US 2013/0220791 A1  Aug. 29, 2013

(30) Foreign Application Priority Data

Feb. 24, 2012 (JP) .................................. 2012-038988

(51) Int. Cl.
| | |
|---|---|
| *B01D 1/28* | (2006.01) |
| *B01D 3/00* | (2006.01) |
| *B01D 3/14* | (2006.01) |
| *B01D 3/42* | (2006.01) |

(52) U.S. Cl.
CPC ........ *B01D 3/007* (2013.01); *B01D 1/28* (2013.01); *B01D 3/143* (2013.01); *B01D 3/4261* (2013.01)

(58) Field of Classification Search
CPC .......... B01D 1/28; B01D 3/324; B01D 3/322; B01D 3/007; B01D 3/141; B01D 3/143; B01D 3/4261

USPC ........ 202/154, 158, 172, 182; 203/26, 71, 98, 203/DIG. 8
See application file for complete search history.

(56) References Cited

U.S. PATENT DOCUMENTS

| | | | | |
|---|---|---|---|---|
| 3,575,007 | A * | 4/1971 | Gunther ......................... | 62/620 |
| 4,234,391 | A * | 11/1980 | Seader ........................... | 203/26 |
| 4,277,268 | A * | 7/1981 | Spangler, Jr. .................. | 62/630 |
| 4,539,076 | A * | 9/1985 | Swain ............................ | 202/154 |
| 4,737,177 | A * | 4/1988 | Erickson ........................ | 62/646 |
| 4,961,826 | A * | 10/1990 | Grethlein et al. .............. | 203/19 |
| 5,351,492 | A * | 10/1994 | Agrawal et al. ............... | 62/648 |
| 5,435,436 | A * | 7/1995 | Manley et al. ................. | 203/74 |

(Continued)

FOREIGN PATENT DOCUMENTS

| | | |
|---|---|---|
| JP | 2004-016928 | 1/2004 |
| JP | 2011-078872 | 4/2011 |

*Primary Examiner* — Duane Smith
(74) *Attorney, Agent, or Firm* — Knobbe Martens Olson & Bear LLP

(57) ABSTRACT

A distillation apparatus includes a rectifying column, a stripping column located above seen from the rectifying column, a liquid sump unit located at a predetermined stage of the stripping column and configured to hold liquid that has flowed downward, a heat exchanger located in the liquid sump unit, a second pipe for introducing vapor in the rectifying column to the heat exchanger of the stripping column, and a third pipe for introducing fluids flowing out from the heat exchanger of the stripping column to the rectifying column. Further, a flare line having lower pressure than pressure in the rectifying column is connected to a downstream side of the third pipe. The distillation apparatus can switch a first flow toward an inside of the rectifying column through the third pipe to a second flow branching from the third pipe toward a pipe at a lower pressure side.

7 Claims, 4 Drawing Sheets

(56) References Cited

U.S. PATENT DOCUMENTS

| | | | |
|---|---|---|---|
| 5,737,940 A * | 4/1998 | Yao et al. | 62/620 |
| 5,783,047 A * | 7/1998 | Aso et al. | 202/154 |
| 6,045,660 A * | 4/2000 | Savage et al. | 202/172 |
| 6,348,137 B1 * | 2/2002 | Nommensen | 203/49 |
| 6,605,190 B1 * | 8/2003 | Salamon et al. | 203/1 |
| 7,824,542 B2 * | 11/2010 | Menzel | 208/341 |
| 7,972,423 B2 * | 7/2011 | Jensen | 96/234 |
| 8,002,952 B2 * | 8/2011 | Sechrist | 202/153 |
| 2008/0135396 A1 * | 6/2008 | Blum | 203/25 |

* cited by examiner

Prior Art

HEAT INTEGRATED DISTILLATION APPARATUS

This application is based upon and claims the benefit of priority from Japanese patent application No. 2012-038988, filed on Feb. 24, 2012, the disclosure of which is incorporated herein in its entirety by reference.

BACKGROUND OF THE INVENTION

1. Field of the Invention

The present invention relates to a distillation apparatus that carries out a distillation operation widely applied to many industrial processes, and more particularly to a heat integrated distillation apparatus.

2. Description of the Related Art

Distillation separation is a unit operation widely applied to industrial processes in general, but consumes a large amount of energy. In the industrial field, therefore, studies have been conducted on an energy saving distillation systems. Such studies have brought about development of a heat integrated distillation column (hereinafter, HIDiC) as a distillation apparatus that save much energy.

As shown in FIG. 1, a basic system of the HIDiC has a structure in which a rectifying section (high-pressure unit) and a stripping section (low-pressure unit) are provided such that they are separate from each other. Operation pressure of the rectifying section is set higher than that of the stripping section so that the operation temperature of the rectifying section can be higher than that of the stripping section. This enables a reduction in the amount of heat that is supplied to a reboiler because heat transfer occurs from the rectifying section to the stripping section when there is a heat-exchange surface therebetween. Heat of the rectifying section moves to the stripping section, and hence the amount of heat that is supplied at a reboiler can be reduced. As a result, high energy saving distillation apparatus can be achieved.

In order to put the concept of HIDiC to practical use, a number of distillation apparatuses having double-pipe structures, that is, double-pipe structures constituted of inner pipes forming rectifying sections and outer pipes forming stripping sections have been proposed (For example, refer to JP2004-16928A). These configurations are described as being capable of reducing the amounts of heat that are supplied to the reboilers and the amounts of heat that are removed at the condensers, since heat transfer occurs from the rectifying sections (inner pipes) to the stripping sections (outer pipes).

However, the heat integrated distillation apparatus having the rectifying section and the stripping section formed into the double-pipe structures as discussed in JP2004-16928A had the following problems 1) to 6).

1) The product cannot be obtained with side-cut stream. The side-cutting means that a product is withdrawn as an intermediate distillate product, during a distillation process until an end distillate is acquired from top of column.

In the distillation apparatus described in JP2004-16928A, the tube units of the double-pipe structures are arranged to come into contact with each other. Moreover, the outer pipes and the inner pipes are equipped with the structured packing. As a result, no pipe arrangement can be formed to withdraw any intermediate distillate product from the inner pipe of each tube unit. Consequently, the structure disables side-cutting.

2) The feed stage where feed stream is provided cannot be optimized. This is because in the rectifying section and, the stripping section formed into the double-pipe structures, packing heights thereof are equal, disabling free setting of the number of stages of the rectifying section and the stripping section.

3) The feed stage cannot be changed so as to meet the feed stream composition. This is because of the structure in which free setting of the feeding stage position is disabled as described in 2).

4) Multi-feed stream (reception of a plurality of feed streams) cannot be dealt with. This is because of the structure in which no feed stream can be supplied in the midway of the double-pipes as described in 1).

5) Maintenance of the apparatus is difficult. The tube units that use the structured packing are densely arranged to be adjacent to each other as described in 1). This disables complete access to the desired tube unit, and maintenance thereof cannot be carried out.

6) The heat exchanged rate between the rectifying section and the stripping section that uses double-pipes and in which there is no a degree of freedom in design for designing the heat transfer area, depends only on the temperature profile of the distillation column. Hence, in apparatus design, a degree of freedom in design of heat exchanged rate is small.

Q, the heat exchanged rate between the rectifying section and the stripping section, is represented by $Q = U \times A \times \Delta T$, where U is an overall heat-transfer coefficient, A is a heat transfer area, and $\Delta T$ is a temperature difference between the rectifying section and the stripping section. In the HIDiC using the double-pipe structure, an inner pipe wall surface becomes a heat transfer area. This heat transfer area has a fixed value determined by a structure of the double-pipes. The overall heat-transfer coefficient also has a fixed value determined by the heat transfer structure and fluid physical properties involved in heat exchange. Thus, as can be understood from the heat exchanged rate formula, a heat exchanged rate on design specification can be changed based only on the temperature difference between the rectifying section and the stripping section, which is changed by the operating pressure of the rectifying section and the stripping section.

As the heat integrated distillation apparatus that can solve the problem as described above, the present applicant has proposed the apparatus of JP4803470B.

FIG. 2 shows an example of the distillation apparatus disclosed in JP4803470B. The distillation apparatus includes rectifying column 1, stripping column 2 located higher than rectifying column 1, first pipe 23 for connecting column top 2c of the stripping column with column bottom 1a of the rectifying column, and compressor 4 that compresses vapor from column top 2c of the stripping column to feed the compressed vapor to column bottom 1a of the rectifying column. The distillation apparatus further includes liquid sump unit 2e located at a predetermined stage of stripping column 2 and configured to hold liquid that has flowed downward, heat exchanger 8 located in liquid sump unit 2e, partition plate 16 that is set in a predetermined position of rectifying column 1 and configured to apart upper stages and lower stages completely, second pipe 29 for introducing vapor below partition plate 16 to heat exchanger 8, and third pipe 30 for introducing fluids introduced through second pipe 29 to heat exchanger 8 and then discharged out of heat exchanger 8 to an upper side of partition plate 16.

With the above described configuration, the vapor is withdrawn from rectifying column 1 through second pipe 29. The vapor is introduced to heat exchanger 8 in stripping column 2. Then, heat can be transferred from rectifying column 1 to stripping column 2. High-pressure vapor in rectifying column 1 ascends through second pipe 29 to heat exchanger 8 in stripping column 2. A fluid partially or totally condensed from the vapor in heat exchanger 8 is accordingly pushed out from stripping column 2 to third pipe 30 outside the column. Thus, this configuration also necessitates no pressure-feeding means such as a pump in supplying liquid from stripping column 2 to rectifying column 1 located at a lower side in a vertical direction.

Further, with the above described apparatus configuration, which transfers heat from rectifying column 1 to stripping column 2 by using second pipe 29, third pipe 30 and heat exchanger 8, as compared with a distillation apparatus including no such heat transfer configuration, the heat exchanged rate removed from condenser 7 attached to the column top of rectifying column 1 can be reduced more, and the heat exchanged rate that is supplied to reboiler 3 attached to the column bottom of stripping column 2 can be reduced more. As a result, a distillation apparatus that is very high in energy efficiency can be provided.

Rectifying column 1 and stripping column 2 can be configured by using trayed sections or packed bed sections similar to those of a general distillation apparatus. Hence, the apparatus can deal with side cutting or multi-feed stream without the need for any improvement, and it is possible to easily perform maintenance of the apparatus. For the same reason, the number of stages of the rectifying column or the stripping column can be freely set, and a feed stage can be optimized.

A heat transfer area can be freely set, and hence the heat exchanged rate can be determined without any dependence on the temperature difference between the columns.

As described above, according to the device example described in JP4803470B (FIG. 2), energy efficiency is high, side-cutting and setting of a feed stage position can be easily dealt with, and maintenance of the apparatus is easy. The apparatus of the present invention has a structure in which a degree of freedom in design is high, and hence can be easily accepted by the user side.

Concerning the distillation apparatus shown in FIG. 2, the present inventors aim at further enhancement in energy efficiency, and consider that the distillation apparatus still has a room to be improved.

In other words, in the distillation apparatus shown in FIG. 2, the following method is adopted. Partition plate 16 that completely partitions the inside of the column to an upper side and a lower side is installed in an arbitrary stage of rectifying column 1, all of vapor ascending from below partition plate 16 is withdrawn from the column through pipe 29, and is supplied to tube-bundle-type heat exchanger 8 installed at an arbitrary stage of stripping column 2, where heat exchange is performed. Thereafter, a fluid partially or totally condensed in heat exchanger 8 flows through pipe 30 outside the column to the upper side of partition plate 16 in rectifying column 1 by gravity, and the condensed liquid flows through another pipe 31 to be movable to below partition plate 16. Such circulation of the fluids is performed.

Such a method intend to withdraw all of the vapor in rectifying column 1 to the outside of the column, and hence adopts a complicated structure in which partition plate 16 is installed in rectifying column 1, and the condensed liquid fed onto partition plate 16 from stripping column 2 is further transferred to a lower side space of partition plate 16 through pipe 31 and control valve 17 outside the column. Thus, there is a room to be improved from the viewpoint of the structure and manufacturing cost.

Further, drive force for the fluids passing through the tube of heat exchanger 8 is obtained by giving pressure loss at the upper and lower sides of partition plate 16, and hence pressure of column bottom 1a needs to be made larger than pressure of column top 1c of rectifying section 1 correspondingly to the pressure loss at the upper and lower sides of partition plate 16. Thus, there arises a need for setting pressure to be higher at an outlet side of compressor 4 (namely, increase a compression ratio) correspondingly to increase in the pressure at column bottom 1a side. Therefore, there is also a room to be improved from the viewpoint of energy saving performance.

SUMMARY OF THE INVENTION

An object of the present invention is to achieve further energy saving and reduction of manufacturing cost in the above described distillation apparatus (FIG. 2) to improve the aforementioned points.

A heat integrated distillation apparatus according to an aspect of the present invention includes: a rectifying column including a trayed section or a packed bed section, which is a column shell used as a rectifying section; a stripping column located above seen from the rectifying column and including a trayed section or a packed bed section, which is a column shell used as a stripping section; a first pipe for communicating a column top of the stripping column with a column bottom of the rectifying column; and a compressor installed in the first pipe and configured to compress vapor from the column top of the stripping column and then feed the compressed vapor to the column bottom of the rectifying column. Further, the aspect of the present invention includes: a liquid sump unit located at a predetermined stage of the stripping column and configured to hold liquid that has flowed downward; a heat exchanger located in the liquid sump unit of the stripping column; a second pipe for introducing vapor in the rectifying column to the heat exchanger of the stripping column; and a third pipe for introducing fluids flowing out from the heat exchanger of the stripping column to the rectifying column.

In the heat integrated distillation apparatus according to the above aspect of the present invention, volume shrinkage generated by withdrawing a part of the vapor from the rectifying column through the second pipe, and totally condensing the vapor in heat exchanger 8 in the stripping column becomes a drive force, and a flow of the fluids from the rectifying column to the stripping column, and further from the stripping column to the rectifying column is obtained. Thus, no pressure-feeding means such as a pump is necessary.

In the present invention, the plate which is configured for complete partition of the upper and lower stages (partition plate 16 of FIG. 2) is not installed in rectifying column 1. Therefore, as compared with the distillation apparatus of FIG. 2, the pressure loss in the rectifying section can be reduced by the amount corresponding to installation of no partition wall, the pressure at the column bottom side of the rectifying column is reduced and the outlet side pressure of the compressor can be suppressed to be low. Thus, energy saving performance is enhanced. Further, the structure can be also simplified.

With the apparatus configuration which transfers heat from the rectifying column to the stripping column by using the second and third pipes and the heat exchanger as described above, as compared with a distillation apparatus including no such heat transfer configuration, the amount of heat removed at a condenser attached to the column top of the rectifying column can be reduced more, and the amount of heat supplied at a reboiler attached to the column bottom of the stripping column can be reduced more. As a result, a distillation apparatus that is very high in energy efficiency can be provided.

Further, the rectifying column and the stripping column are configured by using trayed sections or packed bed sections similar to those of a general distillation apparatus. Hence, the apparatus can deal with side cutting or multi-feed stream without the need for any special improvement, and it is possible to easily perform maintenance of the apparatus. For the same reason, the number of stages of the rectifying column or the stripping column can be freely set, and a raw material feed stage can be optimized.

Furthermore, a heat transfer area can be freely set, and hence the heat exchanged rate can be determined without any dependence on the temperature difference between the columns.

In addition, in the present invention, a line having lower pressure than pressure in the rectifying column is connected to a downstream side of the third pipe. A first flow toward an inside of the rectifying column through the third pipe is switchable to a second flow branching from the third pipe toward the line.

This is because if an inside of an end portion of the third pipe inserted into the rectifying column is brought into a state in which the end portion is not sealed with liquid due to pressure variation or the like during operation of the distillation apparatus, vapor sometimes flows into the third pipe from the inside of the rectifying column, and there arises the fear that the first flow described above is not established. Therefore, when the inside of the end portion of the third pipe inserted into the rectifying column is not sealed with the liquid, the valve that is installed in the third pipe is closed, and the first flow is switched to the second flow, whereby vapor is forcefully introduced into the second pipe from the inside of the rectifying column by the pressure difference between the line having lower pressure than the pressure in the rectifying column and the inside of the rectifying column, the condensed liquid can be stored in the third pipe, and the first flow described above can be regenerated. Thus, circulation in stable side heat exchange is established.

According to the present invention, energy efficiency is high, side-cutting and setting of a feed stage position can be easily dealt with, and maintenance of the apparatus is easy. Further, the apparatus of the present invention has a structure in which a degree of freedom in design is high, and hence can be easily accepted by the user side.

In addition, according to the present invention, further energy saving and reduction in manufacturing cost can be achieved.

The above and other objects, features and advantages of the present invention will become apparent from the following description with reference to the accompanying drawings which illustrate examples of the present invention.

Figure 1:
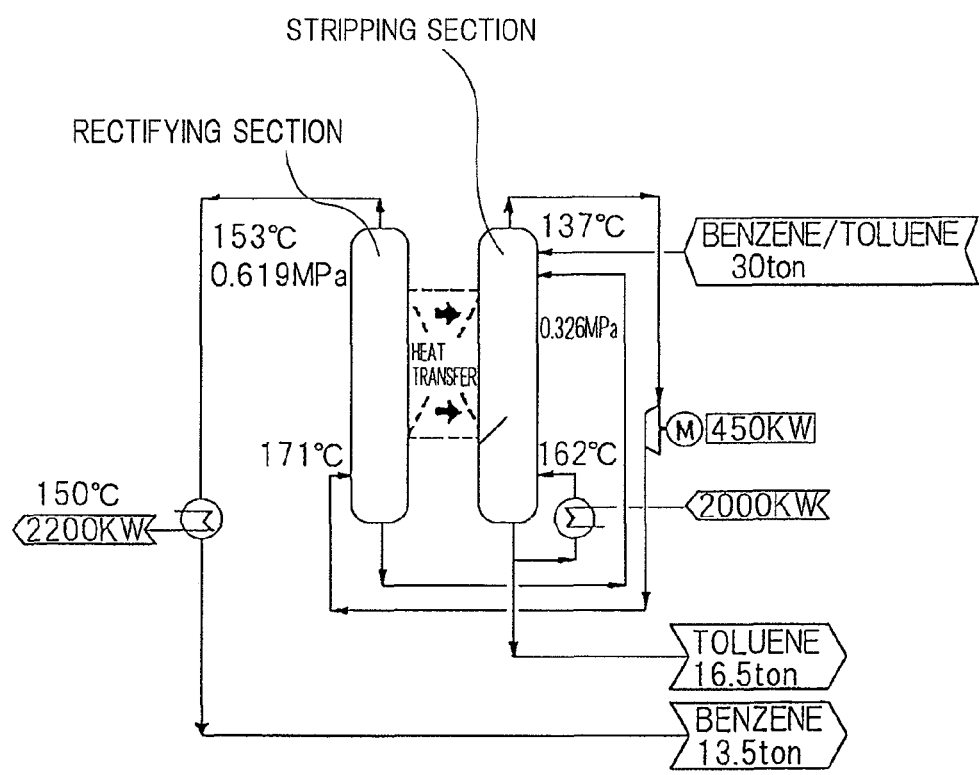
FIG. 1 shows a basic structure of HIDiC.

EXPLANATION OF LETTERS 1 rectifying column
1a column bottom
1b trayed section (or packed bed section)
1c column top
2 stripping column
2a column bottom
2b trayed section (or packed bed section)
2c column top
2d liquid withdrawal unit
2e liquid sump unit
3 heater (reboiler)
4 compressor
5 chimney tray for sump
6 pump
7 condenser
8 tube-bundle-type heat exchanger
5, 15 chimney tray for sump
9 chimney tray for sump
10, 12, 14 liquid
11, 13, 18 vapor
21, 22, 23, 24, 25, 26, 27, 28, 29, 30, 31 pipe
30a outlet of pipe
42, 45 valve
43 flare line
46 monitoring means

DETAILED DESCRIPTION OF THE EXEMPLARY EMBODIMENT

A heat integrated distillation apparatus according to the present invention has a basic feature in which a column shell (stripping column) that is used as a stripping section extending in a vertical direction, and a column shell (rectifying column) that is used as a rectifying section extending in the vertical direction are provided separately from each other, and the stripping column is located higher than the rectifying column. A general distillation apparatus, which is not an internally heat integrated distillation apparatus, includes a column built in a vertical direction and having a column bottom, a trayed section (or packed bed section) and a column top, wherein at a boundary of a feed location, an upper side of the trayed section (or packed bed section) is a rectifying section and a lower side is a stripping section, and is totally different from the heat integrated distillation apparatus according to the present invention. In particular, an arrangement described as follows is made by adding an improvement to the distillation apparatus shown in FIG. 2 that is proposed by the present applicant. Thus, an embodiment example of the present invention will be described by using the same reference signs for the same components as those shown in FIG. 2.

Figure 3:
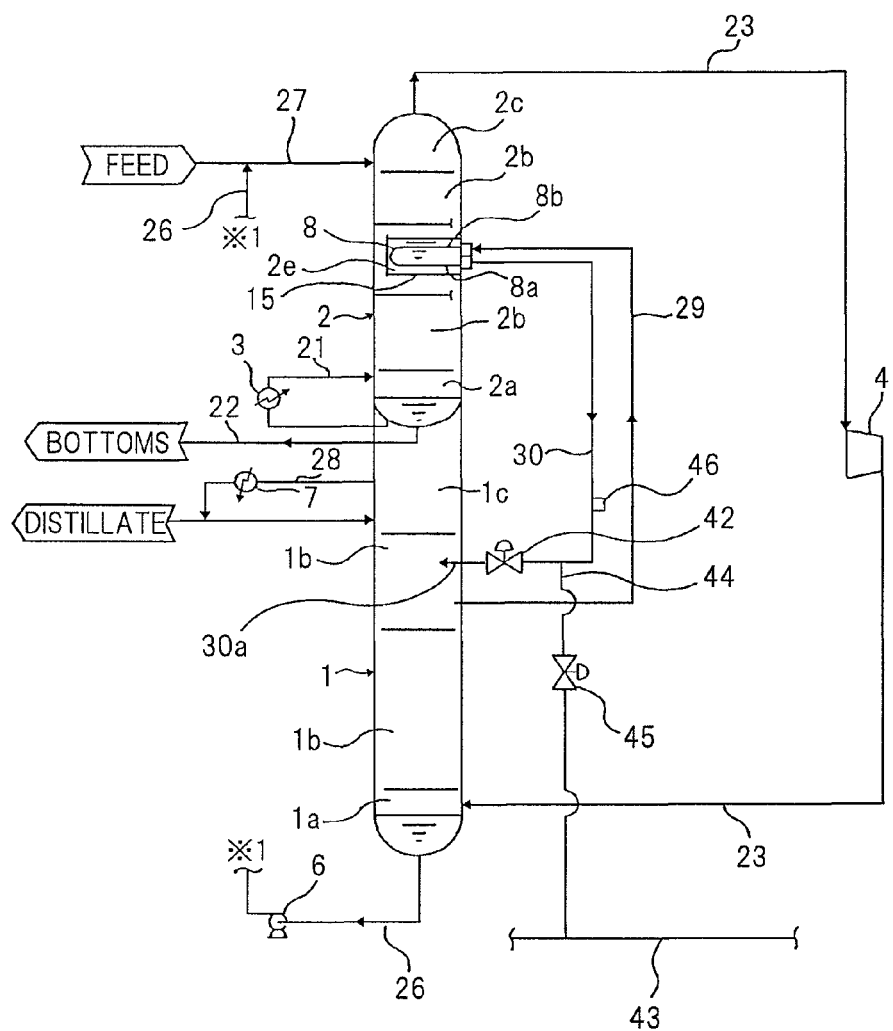
FIG. 3 shows an overall configuration of a heat integrated distillation apparatus according to one embodiment of the present invention.

FIG. 3 shows an overall configuration of a heat integrated distillation apparatus according to an embodiment of the present invention. The heat integrated distillation apparatus according to the embodiment includes rectifying column 1 and stripping column 2 that are located higher than rectifying column 1. Rectifying column 1 includes column bottom 1a, trayed section (or packed bed section) 1b, and column top 1c. Stripping column 2 also includes column bottom 2a, trayed section (or packed bed section) 2b, and top column 2c.

Trayed section 1b and 2b are sections where several horizontal trays are located therein. A tray on which vapor and liquid contact mutually is referred to as a stage. At each stage, gas-liquid contact promotes a mass transfer. As a result, a gas phase having rich in components with higher volatility ascends to an upper stage, while a liquid phase having rich in components with lower volatility descends to a lower stage. Then, gas-liquid contact is executed again with a new liquid phase or gas phase there for further mass transfer. Thus, there are components in rich with higher volatility at a higher stage of the column, there are components in rich with lower volatility at a lower stage, and a distillation operation is accomplished.

The packed section that can replace the trayed section is a section where a certain packing is installed in the empty column, and gas-liquid contact is executed on its surface. By the same mechanism as that of the trayed column, there are components in rich with higher volatility at a higher part, there are components in rich with lower volatility at a lower part, and a distillation operation is accomplished.

In FIG. 3, trayed sections 1b and 2b (or packed bed sections) are shown as blank. In reality, however, the abovementioned structures are employed.

Each of rectifying column 1 and stripping column 2 is described in detail. First, stripping column 2 is described.

Heater 3 referred to as a reboiler is disposed outside column bottom 2a of stripping column 2, and pipe 21 is provided from a lower space part of column bottom 2a through heater 3 to an upper space part of column bottom 2a. Liquid descending through trayed section 2b (or packed bed section) of stripping column 2 accordingly stays at column bottom 2a. A part of the liquid is heated by heater 3 to become vapor, and returns to column bottom 2a. From the bottommost part of column bottom 2a, liquid in rich with lower volatility components is acquired through pipe 22.

Column top 2c of stripping column 2 is a position for supplying feed stream. Column top 2c is connected, via compressor 4, to column bottom 1a of rectifying column 1 by using pipe 23. According to an embodiment, the feed stream is supplied at the top of column 2c of stripping column 2. However, the feed stage can be an arbitrary stage of trayed section 2b (or packed bed section). Even when there is a plurality of raw materials, the feed stage can be column top 2c of stripping column 2 and other arbitrary stages (including a stage of rectifying column 1).

Figure 4:
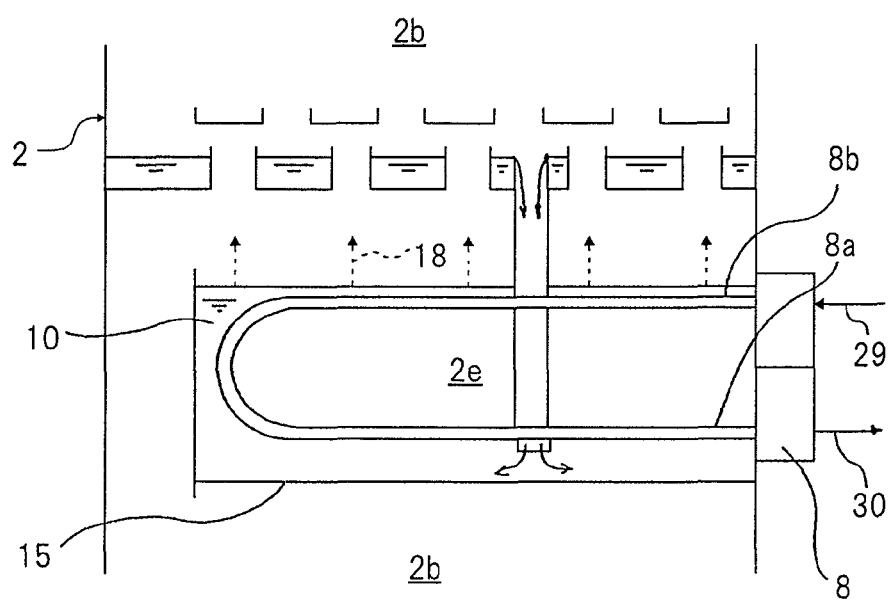
FIG. 4 shows a peripheral configuration of a tube-bundle-type heat exchanger located in a stripping column shown in FIG. 3.

In addition, trayed section 2b (or packed bed section) includes liquid sump unit 2e at a predetermined stage. Liquid sump unit 2e stores a predetermined amount of liquid 10 that has flowed down onto chimney tray for sump 15, and liquid spilled from chimney tray for sump 15 drops. In order to dip a U-shaped tube of tube-bundle-type heat exchanger 8 in the liquid stored by liquid sump unit 2e, tube-bundle-type heat exchanger 8 is inserted into liquid sump unit 2e (refer to FIG. 4). Parallel tube portions 8a and 8b in the U-shaped tube of tube-bundle-type heat exchanger 8 are arranged along chimney tray for sump 15.

Pipe 29 (refer to FIG. 3) for feeding fluids from rectifying column 1 to stripping column 2 is connected to upper tube portion 8b of the parallel tube portions. Pipe 30 (refer to FIG. 3) for feeding fluids from stripping column 2 to rectifying column 1 is connected to lower tube portion 8a.

An operation of heat exchanger 8 at liquid sump unit 2e is described.

In the apparatus, a raw material liquid descends from column top 2c of stripping column 2 through a trayed or a packed layer. Liquid 10 (refer to FIG. 4) stays at liquid sump unit 2e on chimney tray for sump 15 that is located at an arbitrary stage. The U-shaped tube of tube-bundle-type heat exchanger 8 is located in liquid sump unit 2e, and hence the U-shaped tube is dipped in liquid 10. In this state, when high-temperature vapor in rectifying column 1 is introduced through pipe 29 into upper tube portion 8b of heat exchanger 8, a part of liquid 10 in contact with the outer walls of tube portions 8b and 8a, where the high-temperature vapor moves, is heated to become vapor 18 and ascends (refer to FIG. 4). The high-temperature vapor introduced through pipe 29 into heat exchanger 8 is condensed and is changed into a liquid phase from a vapor phase while being moved from upper tube portion 8b to lower tube portion 8a. The liquid is introduced through pipe 30 outside the column to a predetermined stage of rectifying column 1 as described below (refer to FIG. 3).

In other words, because a predetermined stage in rectifying column 1 is connected to upper tube portion 8b of heat exchanger 8 in stripping column 2 via pipe 29 and because lower tube portion 8a of heat exchanger 8 in stripping column 2 is connected to the predetermined stage of rectifying column 1 via pipe 30, the high-pressure vapor in rectifying column 1 ascends through pipe 29 toward heat exchanger 8 in stripping column 2. At this time, as compared with a flow directly going upward in rectifying column 1, pressure loss (flow resistance) is larger in pipe 29, and hence, the vapor hardly flows through pipe 29. However, if valve 42 installed in third pipe 30 is closed, a liquid is stored in third pipe 30 and then valve 42 is opened, vapor flows into heat exchanger 8 correspondingly to a volume of the liquid, the vapor is drastically cooled by the liquid of liquid sump unit 2e around it, and large volume shrinkage occurs. Thus, due to the volume shrinkage, force that draws the high-pressure vapor in rectifying column 1 into heat exchanger 8 of stripping section 2 is generated, and a flow of the vapor toward heat exchanger 8 through pipe 29 from rectifying column 1 is established. Liquid that is condensed from vapor in heat exchanger 8 descends into rectifying column 1 by gravity. In this manner, the fluids constantly circulate. Thus, in the circulation of the fluids, no pressure-feeding means such as a pump is necessary.

Rectifying column 1 of the present embodiment is described below.

One end of pipe 26 is connected to a bottommost part of column bottom 1a of rectifying column 1, while the other end of pipe 26 is connected to pipe 27 for supplying feed materials to column top 2c of stripping column 2. To recycle the liquid staying at column bottom 1a of rectifying column 1 to column top 2c of stripping column 2 located higher than rectifying column 1, pump 6 is necessary at the midway section of pipe 26.

Condenser 7 is equipped outside column top 1c of rectifying column 1, and pipe 28 is connected from an upper space part of column top 1c to condenser 7. Thus, vapor that has withdrawn from column top 1c of rectifying column 1 is cooled by the condenser 7 to become liquid, and a distillate liquid having components with higher volatility is acquired. A part of the liquid is refluxed to column top 1c.

In addition, trayed section 1b (or packed bed section) of rectifying column 1 communicates with pipe 29 at a predetermined position, and ascending vapor at this stage is fed to upper tube portion 8b of heat exchanger 8 arranged in liquid sump unit 2e of stripping column 2 through pipe 29 extending in the vertical direction.

Pipe 30 from a stripping column 2 penetrates through an outer wall of rectifying column 1 and is inserted into an upper stage of a stage where pipe 29 is inserted. The liquid condensed from vapor in heat exchanger 8 is introduced into rectifying column 1 through pipe 30. Further, when the vapor ascending in rectifying column 1 reaches column top 1c, the vapor passes through pipe 28 and is cooled in condenser 7. As a result, a distillate liquid having components with higher volatility is acquired.

As described above, according to the embodiment, the vapor is withdrawn from rectifying column 1 through pipe 29, the vapor is introduced into heat exchanger 8 in stripping column 2, and thereby the heat in rectifying column 1 is removed and can be transferred into stripping column 2. A heat transfer system using pipes 29 and 30 and heat exchanger 8 as in the case of the embodiment is configured as if a side condenser is installed at an arbitrary stage of rectifying column 1 and, simultaneously, as if a side reboiler is installed at an arbitrary stage of stripping column 2. Thus, as compared with a distillation apparatus that includes no such heat transfer system, the amount of heat that has been removed can be reduced at condenser 7 of rectifying column 1, and the amount of heat that has been supplied can be reduced at reboiler 3 of stripping column 2. As a result, a high energy saving distillation apparatus can be achieved. FIG. 3 shows only one heat transfer system. However, for example, the number of heat transfer systems equivalent to 10 to 30% of the total number of theoretical stages can be installed. Needless to say, the number of heat transfer systems to be installed and locations of the heat exchanger and the pipes can be arbitrarily determined according to a design specification.

Figure 2:
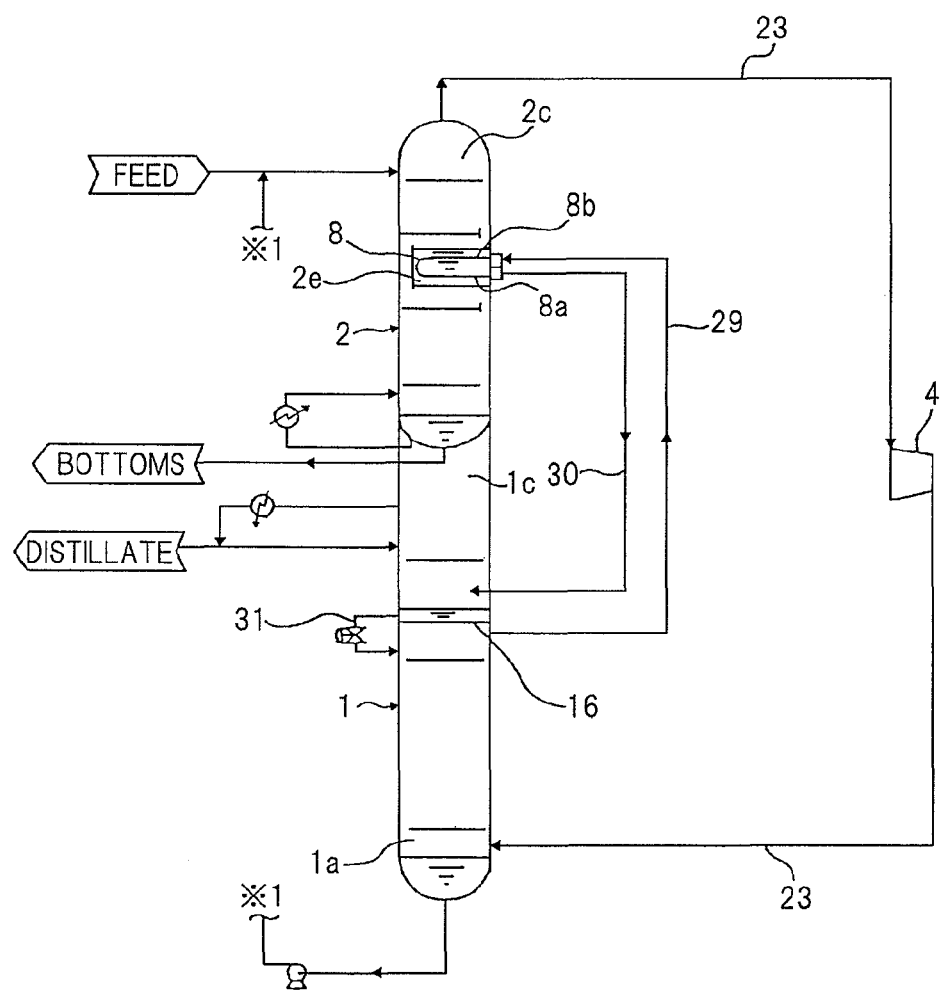
FIG. 2 is a schematic configuration diagram showing an example of a distillation apparatus disclosed in JP4803470B that is a related art relating to the present application.

Further, the present applicant has found out that as described above, even with the configuration in which partition plate 16 is not installed in rectifying column 1 as shown in FIG. 2, the volume shrinkage that is generated by withdrawing the vapor in rectifying column 1 to outside the column, and totally condensing the vapor in heat exchanger 8 in stripping column 2 becomes a drive force, and a flow of the fluids from rectifying column 1 to stripping column 2 and further from stripping column 2 to rectifying column 1 can be obtained.

According to the present invention, as compared with the distillation apparatus of FIG. 2, the pressure loss in rectifying section 1 can be reduced by the amount corresponding to installation of no partition plate 16 as shown in FIG. 2, and pressure at an outlet side of compressor 4 can be suppressed to be low by reducing the pressure at the column bottom side of rectifying column 1. Thus, energy saving performance is enhanced. Further, the structure can be also simplified.

However, if outlet 30a of pipe 30 that communicates with the inside of rectifying column 1 is brought into a state where outlet 30a is not sealed with the liquid due to pressure variation during operation of the distillation apparatus, the vapor sometimes flows into pipe 30 from rectifying column 1, and there is the fear of the flow of the fluids described above being not established.

In order to prevent this, valve 42 that is an opening-closing mechanism which opens and closes a pipe passage is installed in pipe 30 extending from heat exchanger 8 of stripping column 2 to rectifying column 1, as shown in FIG. 3. Further, pipe 44 connected to a low pressure line (flare line 43 in the present example) having lower pressure than the pressure in rectifying column 1 is connected to an upstream side from valve 42 of pipe 30. Valve 45 that is an opening-closing mechanism which opens and closes a pipe passage is also installed in pipe 44.

When outlet 30a of pipe 30 is not sealed with the liquid, valve 42 is closed and valve 45 is opened, whereby vapor is forcefully introduced into pipe 29 from the inside of rectifying column 1 by a pressure difference between flare line 43 and rectifying column 1, and the above described flow of the fluids is regenerated.

Opening and closing of valve 42 and valve 45 are switched in response to a state of the liquid in outlet 30a of pipe 30, and hence monitoring means 46 such as a level gauge or level indicator that can monitor presence and absence of the liquid in the pipes is desirably installed at a spot apart to an upstream side from a position of outlet 30a of pipe 30. For example, when monitoring means 46 detects that the liquid is absent in a site of pipe 30 where it is located, monitoring means 46 sends a signal to opening and closing drive sections of valve 42 and valve 45 to close valve 42 and open valve 45. Thereafter, if a presence of the liquid is confirmed by monitoring means 46, monitoring means 46 opens valve 42 and closes valve 45. Such a method establishes circulation of stable side heat exchange in the distillation apparatus of the example of the present invention.

As the means that forcefully introduces the vapor from the inside of rectifying column 1 into pipe 29, pipe 44 connected to a position at an upstream side from outlet 30a of pipe 30, flare line 43 connected to pipe 44 and having lower pressure than the pressure in rectifying column 1, valve 42 and valve 45 are provided in the above described embodiment. However, elements that achieve the means are not limited to them. The element is not limited to the flare line if only it has pressure lower than the pressure in rectifying column 1. Further, the method may be adopted in which in place of valve 42 and valve 45, a direction switching valve is installed in an intersection point of pipe 30 and pipe 44, and only when lack of liquid in pipe 30 is confirmed by monitoring means 46, a route is switched to only the route flowing from pipe 30 to pipe 44 with the direction switching valve. In this case, the flow of the fluids can be regenerated by forcefully introducing the vapor into pipe 29 from the inside of rectifying column 1 with only operation of one direction switching valve, and hence control becomes easy.

The heat integrated distillation apparatus described above is configured by using the trayed column or the packed column similar to that of the general distillation apparatus. This enables side-cutting or multi-feeding without any need to improve the apparatus, and easy maintenance of the apparatus. For the same reason, freedom for setting the numbers of stages for the rectifying column and the stripping column enables optimization of feed stages. In other words, the present invention can solve problems 1) to 5) of the heat integrated distillation apparatus using the double-pipe structure represented by JP2004-16928A.

According to the embodiment, tube-bundle-type heat exchanger 8 is used as the component of the heat transfer system that transfers heat from rectifying column 1 to stripping column 2. This enables free changing of the heat transfer area A based on a tube design of heat exchanger 8. Thus, in order to determine the amount of heat that is to be exchanged between rectifying column 1 and stripping column 2, not only the temperature difference ΔT between rectifying column 1 and stripping column 2 but also the heat transfer area A can be freely set. The present invention can therefore solve problem 6) of the heat integrated distillation apparatus using the double-pipe structure.

The preferred embodiments of the present invention have been described. However, the embodiments are in no way limitative of the present invention. Needless to say, various changes can be made to the present invention within its technical teachings.

According to the embodiments, rectifying column 1 and stripping column 2 are connected to each other in the vertical direction. However, the present invention is not limited to this arrangement. In other words, the present invention includes an arrangement where rectifying column 1 and stripping column 2 are configured separately and independently, and stripping column 2 is located higher than rectifying column 1.

While preferred embodiments of the present invention have been described using specific terms, such description is for illustrative purposes only, and it is to be understood that changes and variations may be made without departing from the spirit or scope of the following claims.

What is claimed is:

1. A heat integrated distillation apparatus comprising:
a rectifying column including a trayed section or a packed bed section, which is used as a rectifying section;
a stripping column located higher than said rectifying column and including a trayed section or a packed bed section, which is used as a stripping section;
a first pipe that connects a top space of said stripping column with a bottom space of said rectifying column;
a compressor installed in said first pipe and configured to compress vapor from the top space of said stripping column and then feed the compressed vapor to the bottom space of said rectifying column;
a liquid sump unit located at the trayed section or a packed bed section of said stripping column and is configured to hold liquid that has flowed downward;
a heat exchanger located in said liquid sump unit of said stripping column;
a second pipe that introduces vapor in said rectifying column to said heat exchanger of said stripping column;
a third pipe that introduces fluids flowing out from said heat exchanger of said stripping column to said rectifying column; and
a line having lower pressure than said rectifying column, the line branching from said third pipe,
wherein said third pipe comprises a mechanism which can switch a flow of the fluids in said third pipe either to a first flow toward said rectifying column or to a second flow toward the line having the lower pressure.

2. The heat integrated distillation apparatus according to claim 1, further comprising monitoring means that monitors whether or not an inside of an end portion of said third pipe inserted into said rectifying column is sealed with liquid,
wherein when said monitoring means detects that the inside of the end portion is not sealed with the liquid, the first flow is switched to the second flow.

3. The heat integrated distillation apparatus according to claim 2, wherein the mechanism is a valve mechanism that switches the flow of the fluids in said third pipe either to the first flow or to the second flow in accordance with a state of the liquid monitored by said monitoring means.

4. The heat integrated distillation apparatus according to claim 1, further comprising a raw material supply pipe that supplies a raw material to at least one of the top space of said stripping column and one of the trayed section and the packed bed section of said stripping column.

5. The heat integrated distillation apparatus according to claim 4, further comprising a pump and a pipe that pressure-feeds liquid in the bottom space of said rectifying column to said raw material supply pipe.

6. The heat integrated distillation apparatus according to claim 1,
wherein a bottom space of said stripping column includes a reboiler that heats liquid in the bottom space.

7. The heat integrated distillation apparatus according to claim 1,
wherein a top space of said rectifying column includes a condenser that cools vapor in the top space.

* * * * *